(12) United States Patent
Choi et al.

(10) Patent No.: US 7,633,589 B2
(45) Date of Patent: Dec. 15, 2009

(54) LIQUID CRYSTAL DISPLAY

(75) Inventors: Nak-Cho Choi, Seoul (KR); Ji-Won Sohn, Seoul (KR); Chong-Chul Chai, Seoul (KR); Hee-Seop Kim, Hwasung-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 531 days.

(21) Appl. No.: 11/387,267

(22) Filed: Mar. 23, 2006

(65) Prior Publication Data

US 2006/0215098 A1    Sep. 28, 2006

(30) Foreign Application Priority Data

Mar. 25, 2005    (KR) ...................... 10-2005-0025044

(51) Int. Cl.
*G02F 1/1337* (2006.01)
*G02F 1/1343* (2006.01)
*G02F 1/1339* (2006.01)

(52) U.S. Cl. ................... 349/143; 349/129; 349/156
(58) Field of Classification Search ................. 349/129, 349/143, 106, 146; 345/88
See application file for complete search history.

(56) References Cited

U.S. PATENT DOCUMENTS

| | | | |
|---|---|---|---|
| 6,204,905 B1 * | 3/2001 | Koma et al. ................. 349/138 |
| 6,466,296 B1 * | 10/2002 | Yamada et al. .............. 349/160 |
| 6,995,394 B2 * | 2/2006 | Hong et al. ................... 257/59 |
| 2004/0046914 A1 * | 3/2004 | Hirota ......................... 349/129 |
| 2005/0094082 A1 * | 5/2005 | Kim et al. .................... 349/145 |
| 2005/0151893 A1 * | 7/2005 | Hong et al. ................... 349/42 |
| 2006/0164565 A1 * | 7/2006 | Lee et al. ...................... 349/43 |

* cited by examiner

*Primary Examiner*—Julie-Huyen L Ngo
(74) *Attorney, Agent, or Firm*—F. Chau & Associates, LLC

(57) ABSTRACT

A liquid crystal display is provided. The liquid crystal display includes: a first substrate, a first electric field generating electrode which is located on the first substrate and which has a plurality of cut portions, a direction control electrode located on the first substrate and overlapping at least one of the cut portions, a second substrate facing the first substrate, a second electric field generating electrode located on the second substrate and opposite to the first electric field generating electrode. The liquid crystal display further includes a liquid crystal layer interposed between the first electric field generating electrode and the second electric field generating electrode, and a slope member located on one of the first and second substrate and having a ridge and a slope. The ridge corresponds to the direction control electrode.

14 Claims, 15 Drawing Sheets

LIQUID CRYSTAL DISPLAY

This application claims priority to Korean Patent Application No. 2005-0025044, filed on Mar. 25, 2005, and the disclosure of which is hereby incorporated by reference herein in its entirety.

BACKGROUND OF THE INVENTION (a) Field of the Invention

The present invention relates to a liquid crystal display.

(b) Description of the Related Art

Liquid crystal displays (LCDs), are one of the most widely used flat panel displays. An LCD includes two panels having electric field generating electrodes such as e.g., pixel electrodes and a common electrode, and a liquid crystal layer interposed therebetween. The liquid crystal display displays an image by applying a voltage to the electric field generating electrodes, which in turn generate an electric field in the liquid crystal layer. The electric field generated in the liquid crystal layer in turn determines the alignment of liquid crystal molecules in the liquid crystal layer to control polarization of incident light.

One known liquid crystal display, is the liquid crystal display with a vertical alignment mode in which the liquid crystal molecules are arranged such that major axes of the liquid crystal molecules are perpendicular to the upper and lower panels in a state in which no electric field is generated. The vertical alignment mode liquid crystal display provides a high contrast ratio and a wide reference viewing angle.

Conventional methods of embodying a wide viewing angle in the liquid crystal display with a vertical alignment mode, include methods of forming cut portions in the electric field generating electrodes, and methods of forming protrusions on the electric field generating electrodes. Cut portions and protrusions are used in conjunction with the vertical alignment mode type liquid crystal displays because the direction in which the liquid crystal molecules are tilted can be determined by the use of these cut portions and protrusions, and thus the reference viewing angle can be widened by arranging the cut portions and the protrusions to distribute the tilt direction of the liquid crystal molecules.

However, with the conventional method of forming the cut portions, a particular mask is required for patterning a common electrode. Additionally, an overcoat layer should be formed on a color filter to prevent pigments of the color filter from leaking and contaminating the liquid crystal layer through the cut portions of the common electrode.

In addition, the liquid crystal display with a vertical alignment mode having the protrusions or the cut portions has a slow response speed. This is partially because the cut portions or the protrusions strongly regulate the liquid crystal molecules close thereto, but weakly regulate the liquid crystal molecules apart therefrom.

Thus, there is a need for a liquid crystal display which has both a wide reference viewing angle as well an improved response speed for its liquid crystal molecules in comparison to conventional liquid crystal displays.

SUMMARY OF THE INVENTION

According to an exemplary embodiment of the present invention, a liquid crystal display is provided. The liquid crystal display comprising: a first substrate, a first electric field generating electrode which is located on the first substrate and which has a plurality of cut portions, a direction control electrode located on the first substrate and overlapping at least one of the cut portions, a second substrate facing the first substrate, a second electric field generating electrode located on the second substrate opposite to the first electric field generating electrode, a liquid crystal layer interposed between the first electric field generating electrode and the second electric field generating electrode, and a slope member located on one of the first and second substrate and having a ridge and a slope. The ridge corresponds to the direction control electrode.

Here, the second electric field generating electrode may have one body covering at least a portion of the second substrate.

The slope angle of the slope may be in the range of about 1° to about 10°.

The slope member may occupy at least half of the total area of the second electric field generating electrode.

The cut portions may include a first cut portion overlapping the direction control electrode and a second cut portion which does not overlap the direction control electrode.

The liquid crystal display may further include a storage electrode formed on the first substrate and the storage electrode may overlap with the second cut portion.

Moreover, the liquid crystal display may further include: first and second gate lines located on the first substrate, first and second data lines intersecting the first and second gate lines, a first thin film transistor connected to the first gate line, the first data line, and the direction control electrode, and a second thin film transistor connected to the second gate line, the second data line, and the first electric field generating electrode.

The second thin film transistor may be turned on shortly after the first thin film transistor is turned off.

The slope member and the cut portions may form an angle of about 45° about the gate lines.

The liquid crystal display may further include a plurality of color filters located under one of the first electric field generating electrode and the second electric field generating electrode, and an overcoat layer located between the second electric field generating electrode and the color filters.

The slope member may be disposed between the overcoat layer and the second electric field generating electrode. In addition, the slope member may be formed integrally with the overcoat layer, and it may have double slope angles.

BRIEF DESCRIPTION OF THE DRAWINGS

Exemplary embodiments of the present invention can be understood in more detail with reference to the attached drawings, in which.

DETAILED DESCRIPTION OF THE EXEMPLARY EMBODIMENTS

Exemplary embodiments of the present invention will now be described more fully with reference to the accompanying drawings. The present invention may, however, be embodied in different forms and thus the present invention should not be construed as being limited to the exemplary embodiments set forth herein.

Figure 1:
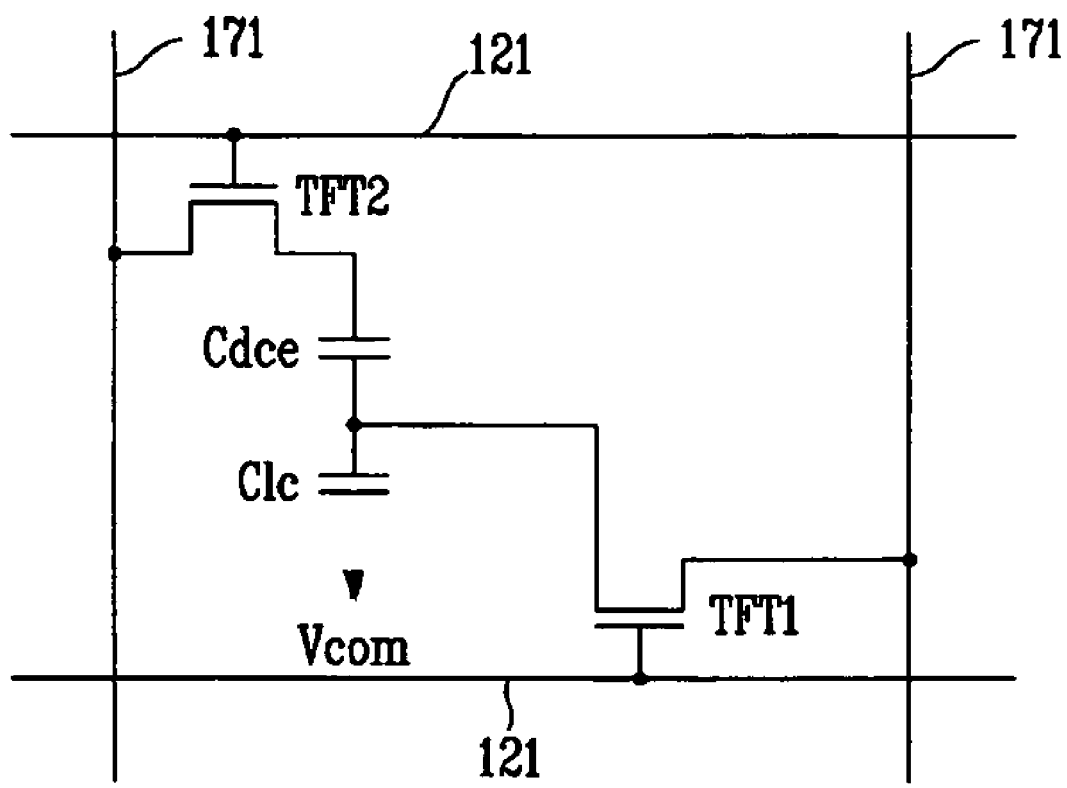
FIG. 1 is a circuit diagram illustrating a liquid crystal display according to an exemplary embodiment of the present invention.

FIG. 1 is a circuit diagram illustrating a liquid crystal display according to an embodiment of the present invention.

Pixel areas are defined by means of intersections between a plurality of gate lines and a plurality of data lines in a thin film transistor panel. Scanning signals are delivered through the gate lines and image signals are delivered through the data lines.

In each pixel area, the following are formed: a pixel thin film transistor TFT1 having a gate electrode connected to the corresponding gate line, a source electrode connected to the corresponding data line, a drain electrode connected to a pixel electrode, a direction-controlling thin film transistor TFT2 having a gate electrode connected to the previous-stage gate line, a source electrode connected to the previous-stage data line, and a drain electrode connected to a direction control electrode.

The pixel electrode forms a liquid crystal capacitor together with a common electrode of a common electrode panel. Moreover, the capacitance of the liquid crystal capacitor is denoted by Clc. The direction control electrode forms a capacitive coupling together with the pixel electrode, and the capacitance of the capacitive coupling is denoted by Cdce.

In addition, each pixel electrode of the liquid crystal display of the present embodiment has a cut portion, and the common electrode has a slope member. Moreover, the direction control electrode and the cut portion overlap with each other such that an electric field generated by the direction control electrode can leak through the cut portion. Also, liquid crystal molecules are pre-tilted by the electric field of the direction control electrode leaking through the slope member and the cut portion. Furthermore, when an electric field is applied to the pixel electrode, the pre-tilted liquid crystal molecules are rapidly aligned in the pre-tilted direction without disarray.

To pre-tilt the liquid crystal molecules with the electric field from the direction control electrode, the potential difference (hereinafter, referred to as "voltage of the direction control electrode") of the direction control electrode with respect to the common electrode should be greater by a predetermined value than the potential difference (hereinafter, referred to as "voltage of the pixel electrode") of the pixel electrode with respect to the common electrode.

In the liquid crystal display of the present embodiment, soon before a main signal voltage is applied to the pixel electrode, the direction-controlling thin film transistor TFT2 connected to the previous-stage data line and the previous-stage gate line is turned on, thereby forming a predetermined potential difference between the direction control electrode and the pixel electrode. Soon after the main signal voltage is applied to the pixel electrode and the pixel thin film transistor TFT1 is turned on, the direction-controlling thin film transistor TFT2 is turned off to a floating state. Consequently, in this embodiment, even when the potential of the pixel electrode is changed to another level, the potential of the direction control electrode is always higher than the potential of the pixel electrode. That is, when the pixel thin film transistor TFT1 is turned on and the potential of the pixel electrode increases, the potential of the direction control electrode increases accordingly while maintaining a predetermined difference with respect to the potential of the pixel electrode. Therefore, the voltage of the direction control electrode is always higher than the voltage of the pixel electrode.

The leakage current of the direction-controlling thin film transistor TFT2 may increase with an increase in voltage of the direction control electrode. However, in the embodiments of the present invention, since a slope member is formed on the common electrode panel to form a fringe field and the voltage of the direction control electrode is used only when the electric field generated by the slope member is not sufficient, the voltage of the direction control electrode need not be high.

Figure 2:
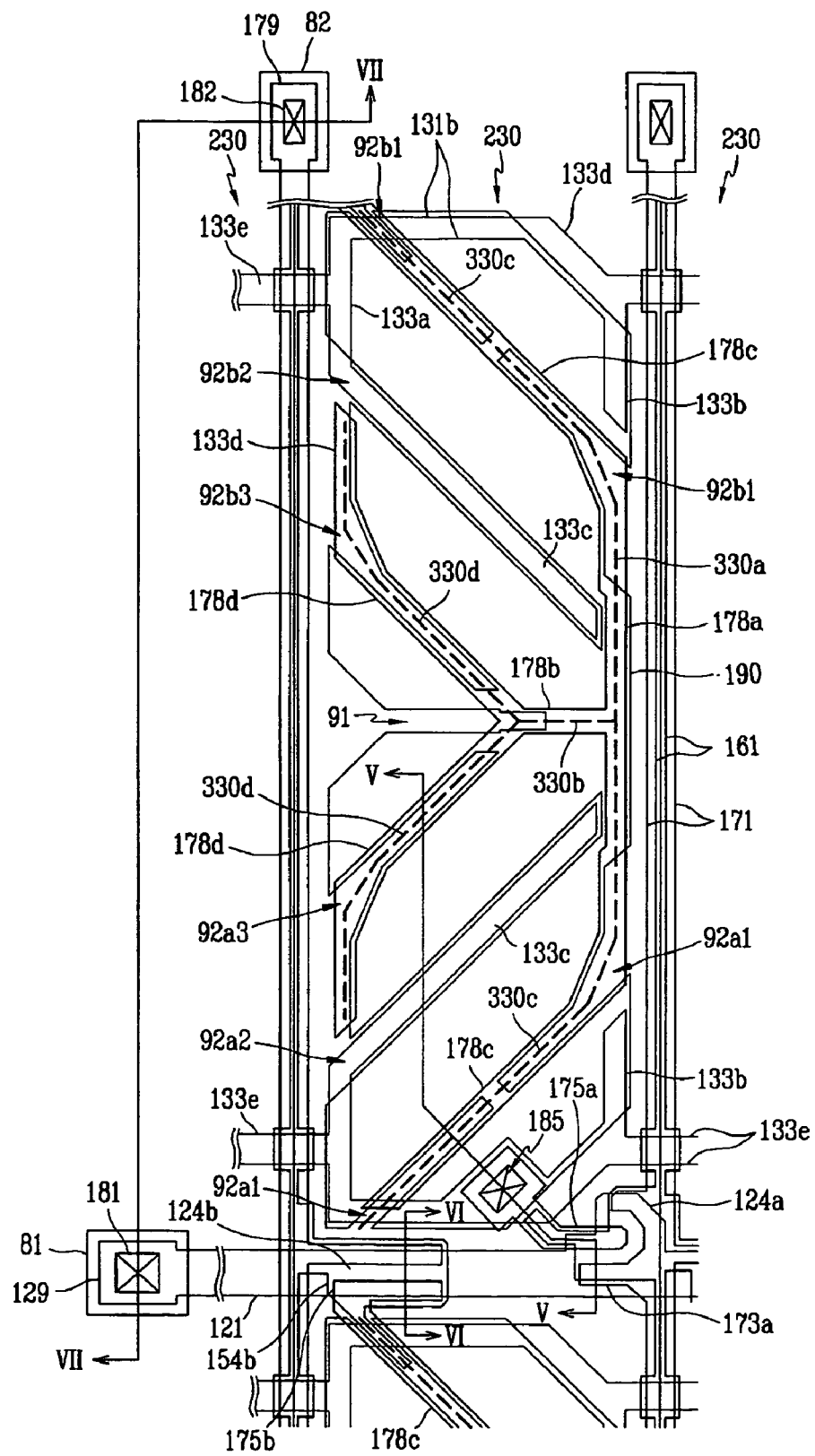
FIG. 2 is a layout diagram illustrating a liquid crystal display according to an exemplary embodiment of the present invention.
Figure 3:
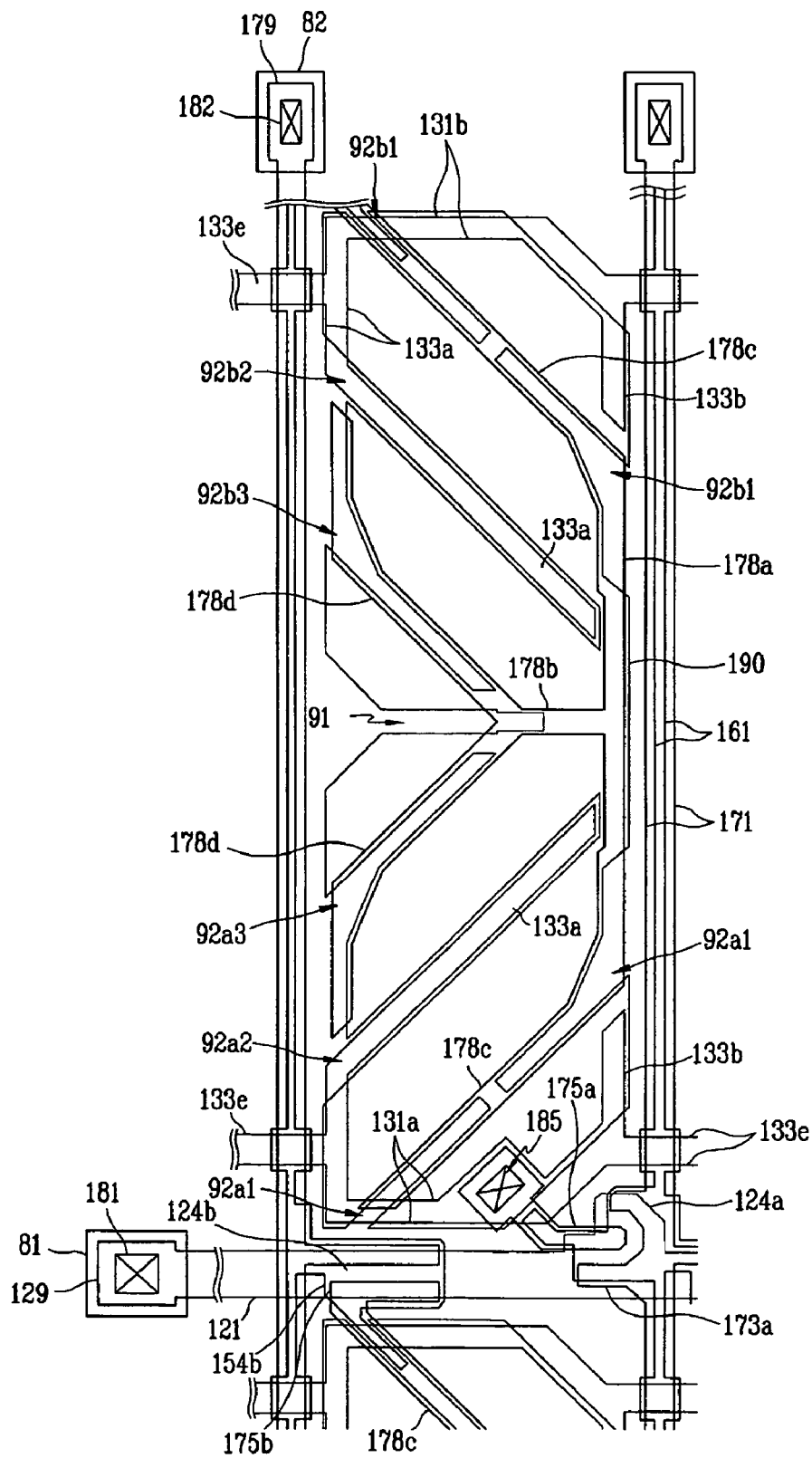
FIG. 3 is a layout diagram illustrating a thin film transistor panel of the liquid crystal display shown in FIG. 2.
Figure 4:
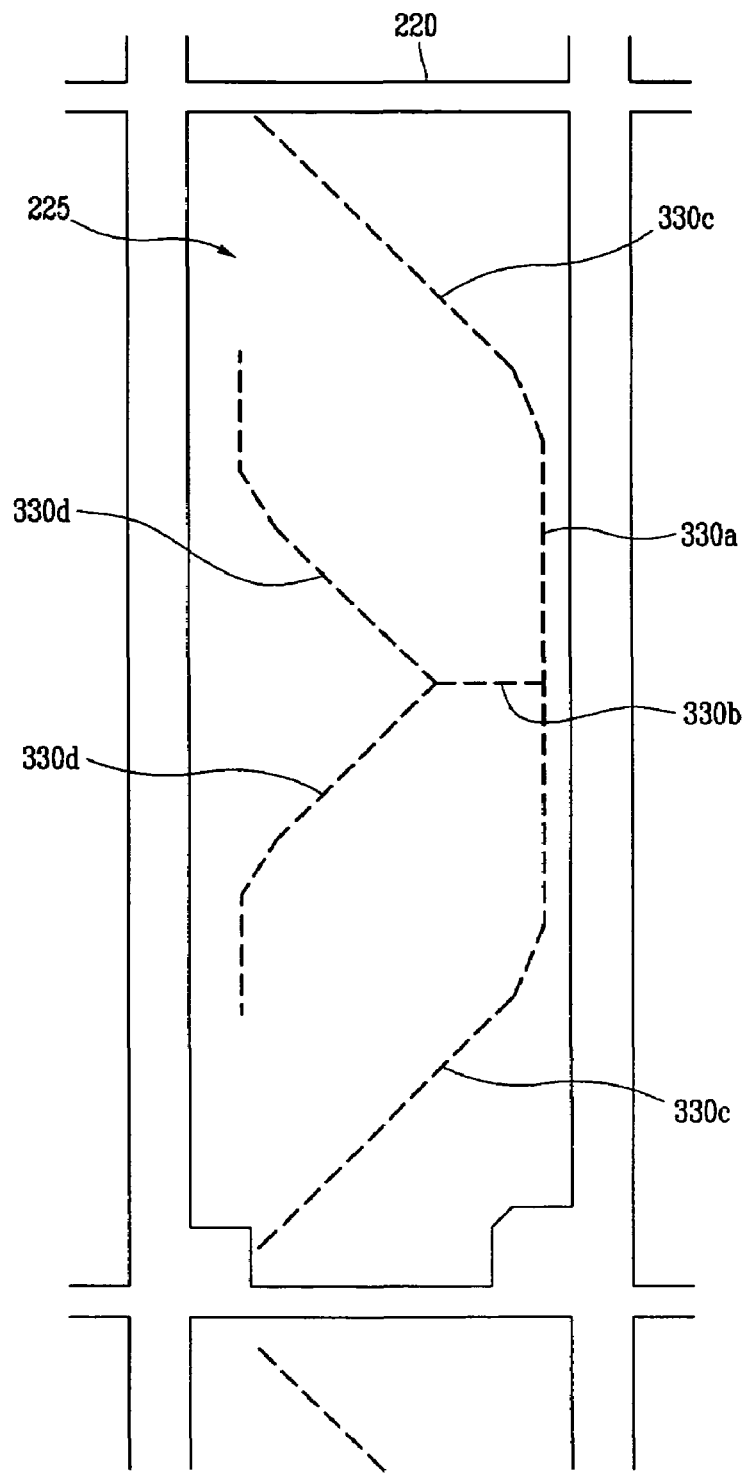
FIG. 4 is a layout diagram illustrating a common electrode panel of the liquid crystal display shown in FIG. 2.
Figure 5:
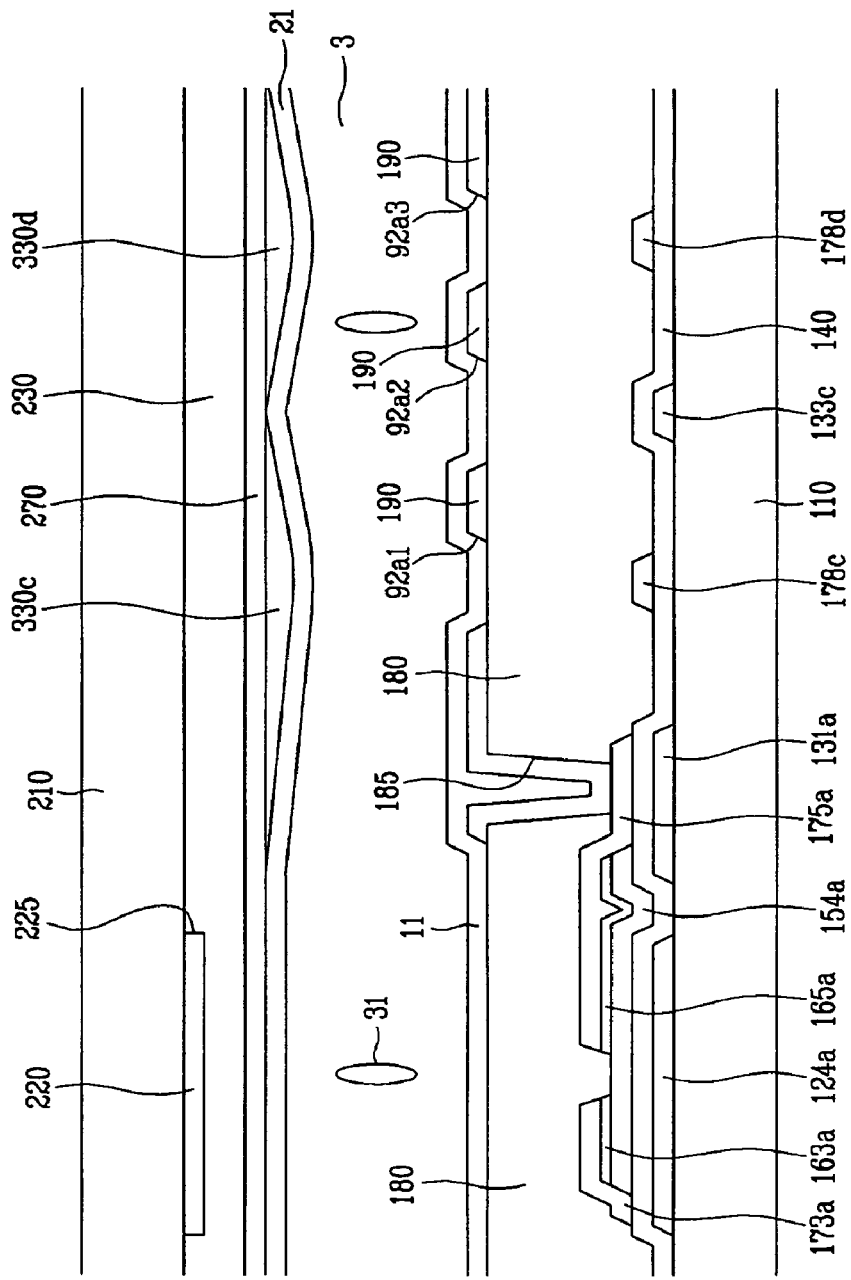
FIG. 5 is a cross-sectional view of the liquid crystal display taken along Lines V-V of FIG. 2.
Figure 6:
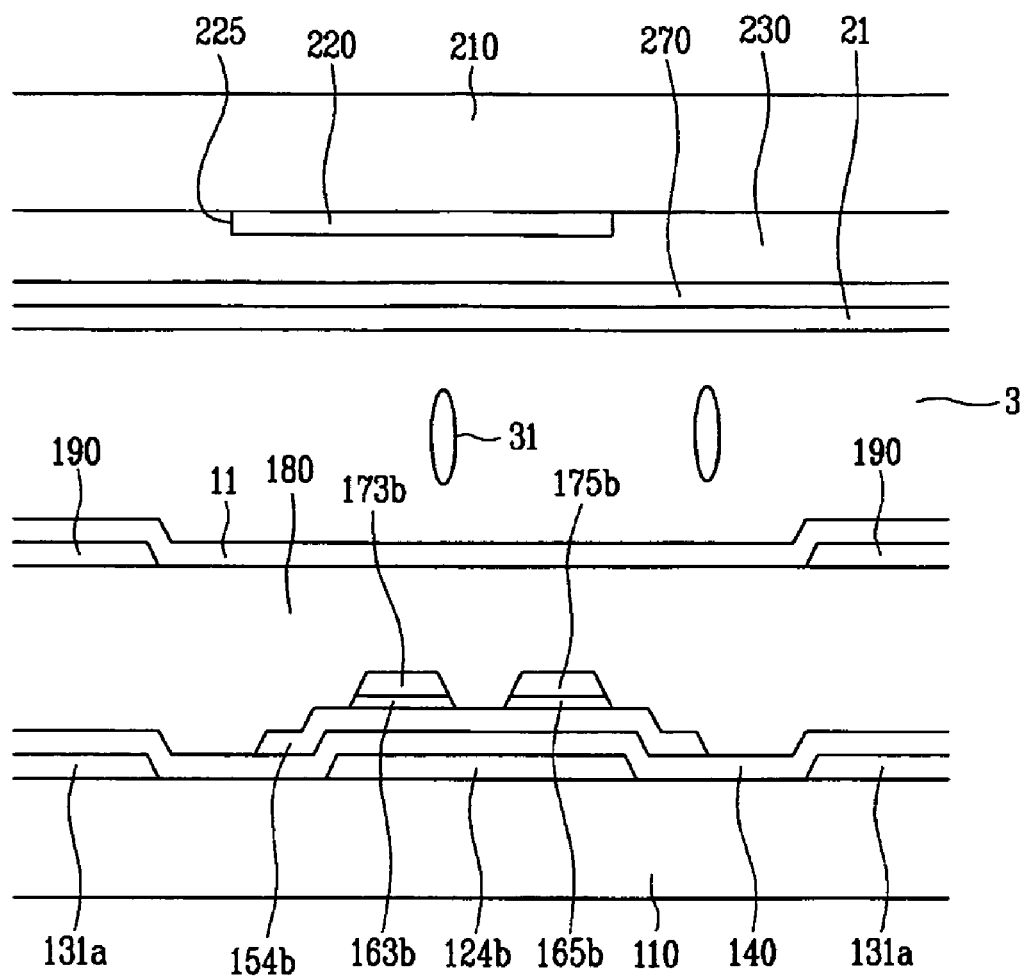
FIG. 6 is a cross-sectional view of the liquid crystal display taken along Lines VI-VI of FIG. 2.
Figure 7:
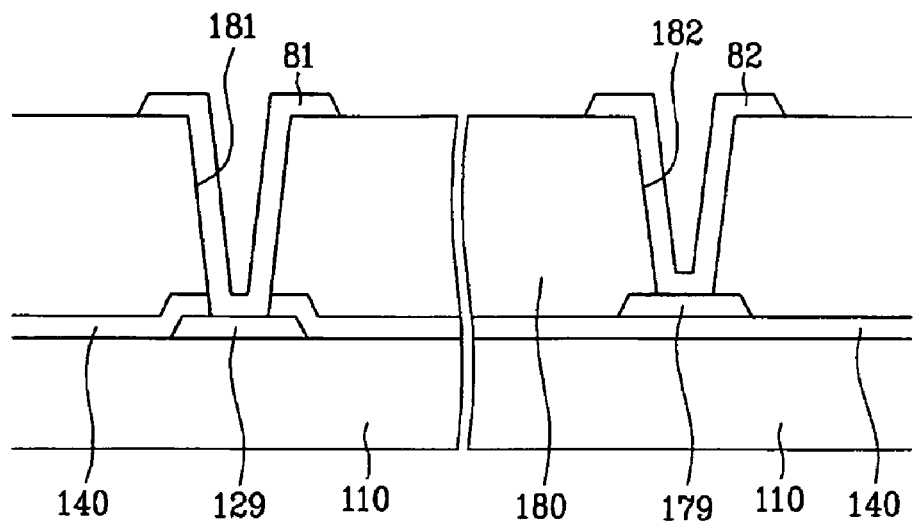
FIG. 7 is a cross-sectional view of the liquid crystal display taken along Lines VII-VII of FIG. 2
Figure 8:
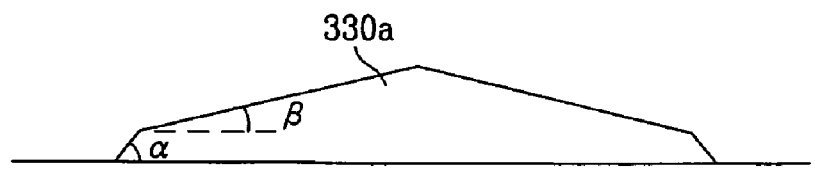
FIG. 8 is a cross-sectional view illustrating a slope member according to an exemplary embodiment of the present invention.

FIG. 2 is a layout diagram illustrating a liquid crystal display according to an embodiment of the present invention. FIG. 3 is a layout diagram illustrating a thin film transistor panel of the liquid crystal display shown in FIG. 2. FIG. 4 is a layout diagram illustrating a common electrode panel of the liquid crystal display shown in FIG. 2. FIG. 5 is a cross-sectional view taken along Lines V-V of FIG. 2. FIG. 6 is a cross-sectional view taken along Lines VI-VI of FIG. 2. FIG. 7 is a cross-sectional view taken along Lines VII-VII of FIG. 2 and FIG. 8 is a cross-sectional view illustrating a slope member according to another embodiment of the present invention.

The liquid crystal display according to an embodiment of the present invention includes a thin film transistor panel 100 and a common electrode panel 200 located opposite to one another, and a liquid crystal layer 3 interposed between the panels 100 and 200.

First, the thin film transistor panel 100 will be described in detail with reference FIGS. 2, 3, 5, 6 and 7.

A plurality of gate lines 121 and a plurality of storage electrode lines 131a and 131b are formed on an insulating panel 110.

The gate lines 121 serve to deliver gate signals and extend mainly in the horizontal direction and are separated from each other. Each gate line 121 has first and second gate electrodes 124a and 124b, which protrude upwardly and downwardly, as well as an expanded end portion 129 for connecting to other layers or driver circuits.

When driver circuits are formed on the thin film transistor panel 100, the gate lines 121 can extend for connection to the driver circuit.

The storage electrode lines 131a and 131b extend mainly in the horizontal direction and are disposed between two neighboring gate lines 121, respectively. Each storage electrode line 131 includes a lower storage electrode line 131a adjacent to a lower gate line 121 and an upper storage electrode line 131b adjacent to an upper gate line 121. Each of the storage electrode lines 131a and 131b includes branches 133a to 133d and connections 133e.

Each set of branches includes first and second storage electrodes 133a and 133b extending perpendicular to the storage electrode lines 131 and third and fourth storage electrodes 133c and 133d extending obliquely therefrom. The third and fourth storage electrodes 133c and 133d are preferably oblique by about 45° with respect to the gate lines 121.

The first storage electrode 133a extends from the corresponding storage electrode line 131 and the third storage electrode 133c is connected to an end of the first storage electrode 133a. The fourth storage electrode 133d connects the storage electrode line 131 and the second storage electrode 133b. The connections 133e connect the first storage electrodes 133a and the second or fourth storage electrodes 133b or 133d to each other. The sets of branches and connections of the respective storage electrode lines 131a and 131b form an inversion type symmetry about the center line between two neighboring gate lines 121.

The storage electrode lines 131a and 131b are supplied with a predetermined voltage such as a common voltage which is supplied to a common electrode 270 of the common electrode panel 200.

The gate lines 121, the storage electrode lines 131a and 131b may be made of various metals and conductive materials. For example, the gate lines 121 and the storage electrode lines 131a and 131b may be made of an aluminum group metal such as aluminum (Al) or an aluminum alloy, a silver group metal such as silver (Ag) or a silver alloy, a copper group metal such as copper (Cu) or a copper alloy, a molybdenum group metal such as molybdenum (Mo) or a molybdenum alloy, chromium, titanium, or tantalum. Alternatively, the gate lines 121, the storage electrode lines 131a and 131b may have a multi-layered structure including two conductive layers having different physical properties. One conductive layer thereof may be made of a metal having low resistance such as, for example, an aluminum group metal, a silver group metal, and a copper group metal to reduce delay of signals or voltage drop. The other conductive layer may be made of for example, a metal having excellent physical, chemical, and electrical contact characteristics with ITO (Indium Tin Oxide) or IZO (Indium Zinc Oxide), such as e.g., a molybdenum group metal, chromium (Cr), titanium (Ti), and tantalum (Ta). An example of such a combination can include a combination of a chromium lower layer and an aluminum (alloy) upper layer and a combination of an aluminum (alloy) lower layer and a molybdenum (alloy) upper layer.

The side surfaces of the gate lines 121 and the storage electrode lines 131a and 131b are sloped with respect to the surface of the panel 110, and the slope angle is in the range of about 30° to about 80°.

A gate insulating layer 140 made of silicon nitride ($SiN_x$) or the like is formed on the gate lines 121, and the storage electrode lines 131a and 131b.

A plurality of linear shaped semiconductor patterns 151 made of hydrogenated amorphous silicon (where amorphous silicon can be abbreviated as a-Si) or the like are formed on the gate insulating layer 140. Each line-shaped semiconductor pattern 151 extends mainly in the vertical direction and includes a plurality of first and second extensions 154a and 154b extending toward the gate electrodes 124a and 124b. Further, in this exemplary embodiment, the line-shaped semiconductor patterns 151 have an enlarged width on the connections 131e of the storage electrodes.

A plurality of line-shaped ohmic contact members 161 and island-shaped ohmic contact members 165a and 165b made of silicide or a material such as n+ hydrogenated amorphous silicon which is doped with n-type impurities such as phosphorous at a high concentration are formed on the semiconductor patterns 151. Each line-shaped ohmic contact member 161 has a plurality of extensions 163a and 163b, and the extensions 163a and 163b and the island-shaped ohmic contact members 165a and 165b, which form pairs, are disposed on the extensions 154a and 154b of the semiconductor patterns 151. Each pair of extensions and island-shaped ohmic contact members is disposed opposite to one another about the respective gate electrodes 124a and 124b.

The side surfaces of the semiconductor patterns 151 and the ohmic contact members 161, 165a, and 165b are also sloped with respect to the surface of the panel 110, and the slope angle is preferably in the range of about 30( to about 80(.

A plurality of data lines 171, a plurality of first and second drain electrodes 175a and 175b separated therefrom, and a plurality of direction control electrodes 178a to 178d are formed on the ohmic contact members 161, 165a, and 165b and the gate insulating layer 140.

The data lines 171 extend mainly in the vertical direction to intersect the gate lines 121 at about a right angle and serve to deliver the data voltages. The data lines 171 also intersect the storage electrode lines 131a and 131b and the connections 133e. Moreover, the data lines 171 are disposed between the first storage electrode 133a and the second storage electrode 133b adjacent to each other. Each data line 171 includes a plurality of first and second source electrodes 173a and 173b extending toward the gate electrodes 124a and 124b and a large-area end portion 179 for connection to another layer or an external device. When a data driving circuit for generating the data voltages is integrated on the panel 110, the data lines 171 can extend such that they are connected directly to the data driving circuit.

The respective first drain electrodes 175a include a large-area end portion for connection to another layer and a bar-shaped end portion positioned on the corresponding gate electrode 124a. The respective first source electrodes 173a are curved to surround a part of the bar-shaped end portion. The large-area end portion of the respective first drain electrodes 124a may overlap with the adjacent storage electrode lines 131a, where the width of the overlapped storage electrodes line 131a can be enlarged.

The second drain electrodes 175b are located opposite to the second source electrodes 173b with a predetermined gap therebetween on the second gate electrodes 124b. One gate electrode 124a or 124b, one source electrode 173a or 173b, and one drain electrode 175a or 175b constitute one thin film transistor (TFT) together with the extension 154a or 154b of the semiconductor pattern 151. A channel of the thin film transistor is formed in the extension 154a or 154b between the source electrode 173a or 173b and the drain electrode 175a or 175b. Here, the first gate electrodes 124a, the first source electrodes 173a, and the first drain electrodes 175a constitute pixel thin film transistors, and the second gate electrodes 124b, the second source electrodes 173b, and the second drain electrodes 175b constitute the direction-controlling thin film transistors.

The direction control electrodes 178a, 178b, 178c, and 178d are disposed inside the respective pixels and include a vertical portion 178a extending in the vertical direction along the data lines 171, a horizontal portion 178b extending in the direction perpendicular to the vertical portion 178a from the vertical portion 178a, a first slanted portion 178c extending obliquely between both ends of the vertical portion 178a, and a second slanted portion 178d extending in the vertical direction from an end of the horizontal portion 178b parallel to the first slanted portion 178c. An end of the second slanted portion 178d may further include a portion that is curved parallel to the data lines 171. Here, it is preferable that the first and second slanted portions 178c and 178d are slanted about the gate lines 121 by about 45°.

In this exemplary embodiment, an end of the first slanted portion 178c is connected to the corresponding second drain electrode 175b and the direction control electrodes 178a, 178b, 178c, and 178d, to form an inversion type symmetry with respect to the horizontal portion 178b.

The data lines 171, the drain electrodes 175a and 175b, and the direction control electrodes 178a, 178b, 178c, and 178d may include e.g., a refractory metal including but not limited to a molybdenum grouped metal, chromium, tantalum, and titanium, or alloys thereof, and may have a multi-layered structure including a conductive layer made of a refractory metal and a conductive layer having low resistance. Examples of the multi-layered structure can include a double-layered film having a chromium (alloy) or molybdenum (alloy) lower layer and an aluminum (alloy) upper layer, and a triple-layered film having a molybdenum (alloy) lower layer, an aluminum (alloy) intermediate layer, and a molybdenum (alloy) upper layer. The above-mentioned multi-layered structure is not limited to the above materials but rather may be composed of a variety of metal and conductive materials known to those skilled in the art.

Similarly to the gate lines 121 and the storage electrode lines 131a and 131b, the side surfaces of the data lines 171, the drain electrodes 175a and 175b, and the direction control electrodes 178a, 178b, 178c, and 178d are sloped in the range of about 30° to about 80°.

The ohmic contact members 161, 165a, and 165b exist only between the semiconductor patterns 151 at the lower side thereof and the data lines 171 and the drain electrodes 175a and 175b at the upper side thereof, and they serve to decrease the ohmic resistance. The line-shaped semiconductor patterns 151 have exposed portions between the source electrodes 173a and 173b and the drain electrode 175a and 175b, and on the data lines 171 and the drain electrodes 175a and 175b.

A passivation layer 180 is formed on the data lines 171, the drain electrodes 175a and 175b, and the portions of the semiconductor patterns 151 not covered with them. The passivation layer 180 is made of an inorganic insulating material such as silicon nitride and silicon oxide, an organic insulating material, or an insulating material having a low dielectric constant. It is preferable that the dielectric constant of the insulating material having a low dielectric constant is 4.0 or less. Examples thereof include a-Si:C:O and a-Si:O:F formed by the use of a plasma enhanced chemical vapor deposition (PECVD) method. The passivation layer 180 may be made of an organic insulating material having photosensitivity, and the surface of the passivation layer 180 may be flat. Alternatively, the passivation layer 180 may have a double-layered structure including a lower inorganic layer and an upper organic layer so as to secure the excellent insulating characteristic of the organic layer and protect the exposed portions of the semiconductor patterns 151 with the inorganic layer.

A plurality of contact holes 182 and 185 for exposing the end portions 179 of the data lines 171 and the first drain electrodes 175a are formed in the passivation layer 180. A plurality of contact holes 181 for exposing the end portions 129 of the gate lines 121 are formed in the passivation layer 180 and the gate insulating layer 140. The contact holes 181, 182, and 185 may have a variety of shapes, such as polygonal and circular. The side surfaces of the contact holes 181, 182, and 185 may be sloped at about 30° to about 85° or may have a step shape.

A plurality of pixel electrodes 190 and a plurality of contact assistants 81 and 82 are formed on the passivation layer 180, and may be made of at least one of a transparent conductive material such as e.g., ITO and IZO and a metal having excellent reflectivity such as aluminum or a silver alloy. The pixel electrodes 190 are physically and electrically connected to the drain electrodes 175a through the contact holes 185, and are supplied with the data voltages from the drain electrodes 175a. The pixel electrodes 190 supplied with the data voltages generate an electric field together with the common electrode 270, thereby determining the alignment of liquid crystal molecules 31 of the liquid crystal layer 3. The pixel electrodes 190 and the common electrode 270 constitute capacitors (hereinafter, referred to as "liquid crystal capacitors") and store the applied voltage after the thin film transistors are turned off. To reinforce the voltage storage ability, other capacitors which are referred to as storage capacitors are connected in parallel to the liquid crystal capacitors. The storage capacitors are formed by overlapping the pixel electrodes 190 with the storage electrode lines 131a and 131b. To enhance the electrostatic capacitance, that is, the storage capacitance, of the storage capacitor, the distance between the terminals is decreased and the overlapping area is increased by allowing the storage electrode lines 131a and 131b and the drain electrodes 175a to extend and overlap with each other.

Each pixel electrode 190 is chamfered at the right corner thereof, and the chamfered oblique side forms an angle of about 45° with respect to the gate lines 121.

Each pixel electrode 190 has a plurality of cut portions. The cut portions include a central cut portion 91, a set of lower cut portions 92a1, 92a2, and 92a3, and a set of upper cut portions 92b1, 92b2, and 92b3. Each pixel is divided into a plurality of pixel partitions by these cut portions 91, 92a1 to 92a3, and 92b1 to 92b3. The cut portions 91, 92a1 to 92a3, and 92b1 to 92b3 form an inversion type symmetry about a virtual horizontal center line dividing each pixel electrode 190 into two halves.

The central cut portion 91 extends along the horizontal center line of the pixel electrode 190 and has an opening of which the width is increased toward the left edge.

The sets of lower and upper cut portions 92a1 to 92a3 and 92b1 to 92b3 extend obliquely in a slanted line from the right edge of the pixel electrode to the left edge. The respective sets of lower and upper cut portions 92a1 to 92a3 and 92b1 to 92b3 have first slanted cut portions 92a1 and 92b1, second slanted cut portions 92a2 and 92b2, and third slanted cut portions 92a3 and 92b3. The first to third slanted cut portions of the set of lower cut portions 92a1 to 92a3 are parallel to each other, and the first to third slanted cut portions of the set of upper cut portions 92b1 to 92b3 are parallel to each other.

The third storage electrode 133c of the storage branch set 133a to 133d overlaps with the second slanted cut portions 92a2 and 92b2, and the slanted portions 178c and 178d of the direction control electrodes overlap with the first and third slanted cut portions 92a1, 92b1, 92a31, and 92b3.

The cut portions 92a1 to 92a3 and 92b1 to 92b3 form a mirror type symmetry about the horizontal center line dividing the pixel electrode 190 into two halves.

The number of partitions partitioned by the cut portions 92a1 to 92a3 and 92b1 to 92b3 or the number of cut portions can vary depending upon design factors such as the size of the pixel, the aspect ratio of the pixel electrode 190, and the kind or characteristic of the liquid crystal layer 3. The tilt direction of the cut portions 92a1 to 92a3 and 92b1 to 92b3 can also vary.

The contact assistants 81 and 82 are connected to the end portions 129 and 179 of the data lines 171 and the gate lines 121 through the contact holes 181 and 182. The contact assistants 81 and 82 reinforce the adhesion between the end portions 179 and 129 of the data lines 171 and the gate lines 121 and an external device, and also protect them.

The direction control electrodes 178a, 178b, 178c, and 178d may be formed in the same layer as the gate lines 121. Trenches may be formed by removing the passivation layer 180 on the direction control electrodes 178a, 178b, 178c, and 178d.

Next, the common electrode panel 200 will be described with reference to FIGS. 2, 4, 5, and 6.

A light blocking member 220 referred to as a black matrix is formed on a transparent insulating panel 210. The light blocking member 220 has a plurality of openings 225 which are located opposite to the pixel electrodes 190 and have substantially the same shape as the pixel electrodes 190. The light blocking member 220 may include only linear portions extending along the data lines 171, and may further include portions located opposite to the thin film transistors. The light blocking member 220 may be formed out of a single-layered film of chromium, a double-layered film of chromium and chromium oxide, or an organic layer including a black pigment.

A plurality of color filters 230 are formed on the panel 210, and most of them are disposed in the openings 225 of the light blocking member 220. The color filters 230 may extend in the vertical direction along the pixel electrodes 190. Each color filter 230 can display one of the primary colors. An example of the primary colors can include the three primary colors of red, green, and blue. Additionally, the edges of the neighboring color filters 230 may overlap with each other.

The common electrode 270 made of a transparent conductive material such as e.g., ITO and IZO is formed on the color filters 230.

An overcoat layer for preventing the color filters from being exposed and providing a flat plane may be formed between the common electrode 270 and the color filters 230.

A plurality of sets of slope members 330a, 330b, 330c, and 330d are formed on the common electrode 270. It is preferable that the slope members 330a to 330d are made of a dielectric material, and that the dielectric constant thereof is less than or equal to the dielectric constant of the liquid crystal layer 3.

Each of the slope members 330a to 330d has a ridge indicated by thick dotted lines in the drawings and a slope. The ridges correspond to the direction control electrodes 178a to 178d. That is, the slope members 330a to 330d include a vertical portion 330a, a horizontal portion 330b, a first slanted portion 330c, and a second slanted portion 330d, which correspond to the vertical portion 178a, the horizontal portion 178b, the first slanted portion 178c, and the second slanted portion 178d of the direction control electrodes, respectively.

The slope is a plane from the ridge to the periphery, and it gradually decreases in height. The height of the ridge may be for example in the range of about 0.5 to about 2.0 µm, and that the slope angle θ of the slope may be for example in the range of about 1° to about 10°.

In addition, in this exemplary embodiment, the area of one set of slope members 330a to 330d is for example greater than half of the area of the corresponding pixel electrode 190. The slope members 330a to 330d for the neighboring pixel electrodes 190 may be connected to each other.

Figure 11:
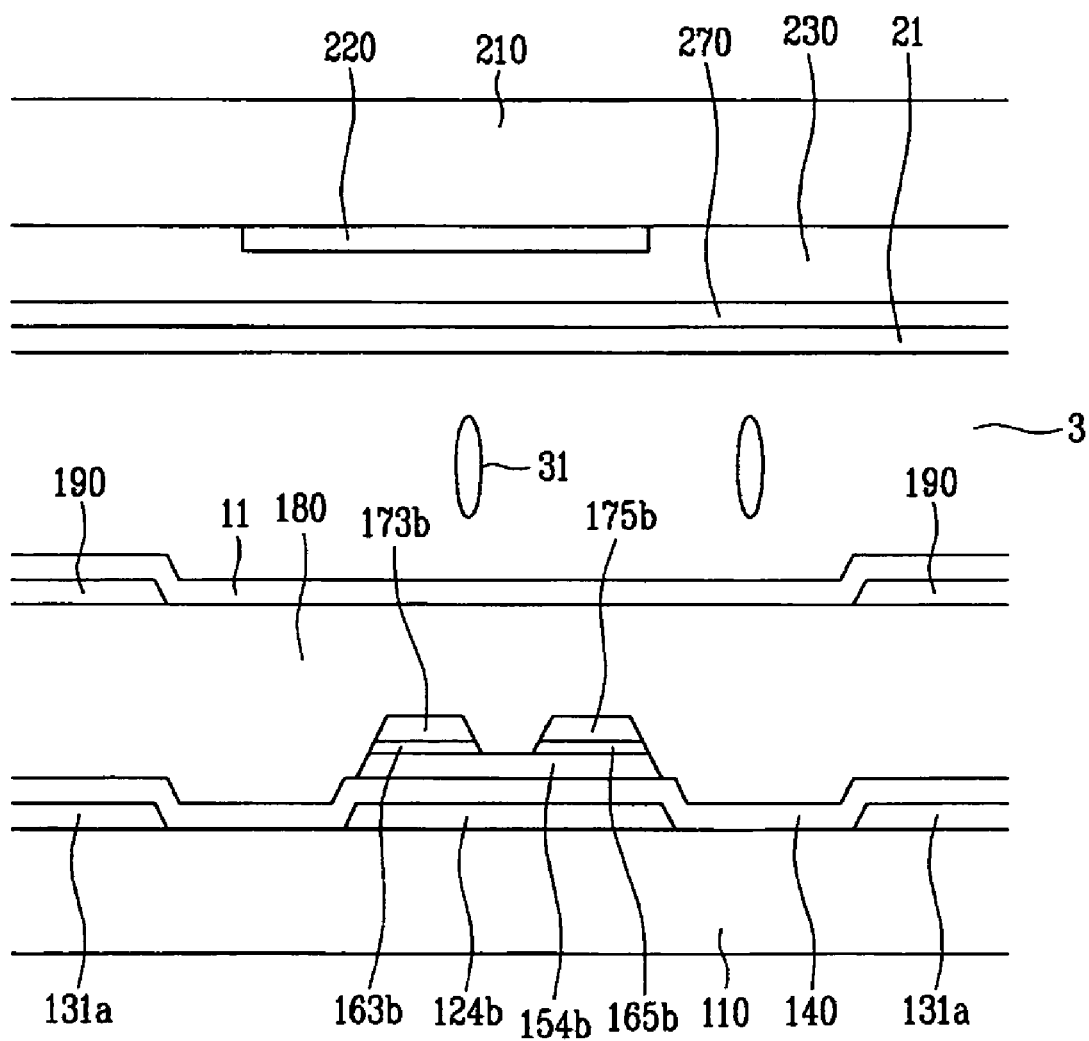
FIG. 11 is a cross-sectional view of the liquid crystal display taken along Line XI-XI of FIG. 9.

The slopes of the slope members 330a to 330d may be bent once in the intermediate portion, as shown in FIG. 11. Also, the slope angle of the slope at the portion closer to the bottom may be for example less than or equal to α=10°, and the slope angle of the slope at the portion closer to the ridge may be for example less than or equal to β=5°. FIG. 7 is a cross-sectional view of the slope member according to an embodiment of the present invention.

Alignment layers 11 and 21 are formed on the inner surfaces of the two panels 100 and 200 described above, and the alignment layers 11 and 21 may be vertical alignment layers. Polarizing films are provided on the outer surfaces of the two panels 100 and 200, and the transmission axes of the two polarizing films are perpendicular to each other with one transmission axis parallel to the gate lines 121. In a reflective liquid crystal display, one polarizing film may be omitted.

At least one retardation film for compensating for the delay of the liquid crystal layer 3 may be interposed between the panels 100 and 200 and the polarizing films. The retardation film has birefringence and serves to reversely compensate for the birefringence of the liquid crystal layer 3. A mono-axial optical film or a biaxial optical film can be used as the retardation film, and preferably a negative mono-axial optical film may be used.

A spacer member which is made of an insulating material to maintain the gap between the two panels 100 and 200 is formed between the thin film transistor panel 100 and the common electrode panel 200.

The liquid crystal display may include the polarizing film, the retardation film, the two panels 100 and 200, and a backlight unit for supplying light to the liquid crystal layer 3.

The liquid crystal layer 3 has a negative dielectric anisotropy, and the liquid crystal molecules 31 of the liquid crystal layer 3 are aligned such that the major axis thereof is almost perpendicular to the surfaces of the two panels without any electric field being present. Therefore, the incident light does not pass through the orthogonal polarizing films and is blocked. When a common voltage is applied to the common electrode 270 and the data voltages are applied to the pixel electrodes 190, an electric field almost perpendicular to the surfaces of the panels 100 and 200 is generated. The liquid crystal molecules 31 change their alignment in response to the electric field such that the major axes thereof become perpendicular to the electric field. At this time, the slope members 330a to 330d of the common electrode 270, the cut portions 91, 92a1 to 92a3, and 92b1 to 92b3 of the pixel electrodes 190, and the edges of the pixel electrodes 190 determine the tilt direction of the liquid crystal molecules 31, which will be described below in detail.

The liquid crystal molecules 31 are pre-tilted by the slope members 330a to 330d without any electric field being present. When the liquid crystal molecules 31 are pre-tilted in this way, the liquid crystal molecules 31 are tilted in the pre-tilted direction with application of an electric field and the tilt direction is perpendicular to the edges of the cut portions 91, 92a1 to 92a3, and 92b1 to 92b3 and the edges of the pixel electrodes 190.

Further, the cut portions 91, 92a1 to 92a3, and 92b1 to 92b3 of the pixel electrodes 190 and the edges of the pixel electrodes 190 parallel to the cut portions 91, 92a1 to 92a3, and 92b1 to 92b3 distort the electric field to generate a horizontal component, which determines the tilt direction. The horizontal component of the electric field is perpendicular to the edges of the cut portions 91, 92a1 to 92a3, and 92b1 to 92b3 and the edges of the pixel electrodes 190.

Equipotential lines of the electric field vary due to the difference in thickness of the slope members 330a to 330d, thereby applying the tilting force to the liquid crystal molecules 31. The tilting force corresponds to the tilt direction determined by the cut portions 91, 92a1 to 92a3, and 92b1 to 92b3 and the slope members 330a to 330d. The tilt force is more substantial when the dielectric constant of the slope members 330a to 330d is smaller than that of the liquid crystal layer 3.

Therefore, in this exemplary embodiment, as described above, the tilt direction of the liquid crystal molecules 31 is determined by the cut portions 91, 92a1 to 92a3, and 92b1 to 92b3 and the oblique sides of the pixel electrodes 190, thereby enhancing the response speed of the liquid crystal molecules 31.

Further, as shown in FIG. 2, one set of cut portions 91, 92a1 to 92a3, and 92b1 to 92b3 and one set of slope members 330a to 330d divide one pixel electrode 190 into multiple sub-areas of which each has two primary edges. The liquid crystal molecules 31 of each sub-area are tilted in the tilt direction described above. The tilt direction includes approximately four directions. By varying the tilt direction of the liquid crystal molecules 31, the reference viewing angle of the liquid crystal display can be enhanced.

Additionally, the direction control electrodes 178a, 178b, 178c, and 178d help with alignment of the liquid crystal molecules when the alignment by the slope members 330a to 330d is not sufficient, by providing the direction control electrodes 178a, 178b, 178c, and 178d in the regions corresponding the slope members 330a to 330d. That is, the electric field formed by slope members 330a to 330d and cut portions 91, 92a1 to 92a3, and 92b1 to 92b3 is further strengthened due to the direction control electrodes 178a to 178d, thereby enhancing the response speed of the liquid crystal molecules.

In this way, since the tilt direction of the liquid crystal molecules 31 can be determined by the use of only the cut portions 91, 92a1 to 92a3, and 92b1 to 92b3 of the pixel electrodes 190 and the slope members 330a to 330d, the cut portions need not be provided in the common electrode 270. Accordingly, a process of patterning the common electrode 270 can be omitted from the method of manufacturing the liquid crystal display. Since electric charges are not accumulated at specific positions because of omitting the cut portions from the common electrode 270, it is possible to prevent the electric charges from moving to the polarizing films and damaging the polarizing films as well. Accordingly, an electrostatic discharge preventing process for preventing damage to the polarizing films can be omitted. Therefore, the omission of the cut portions can significantly reduce the cost for manufacturing the liquid crystal display.

Figure 9:
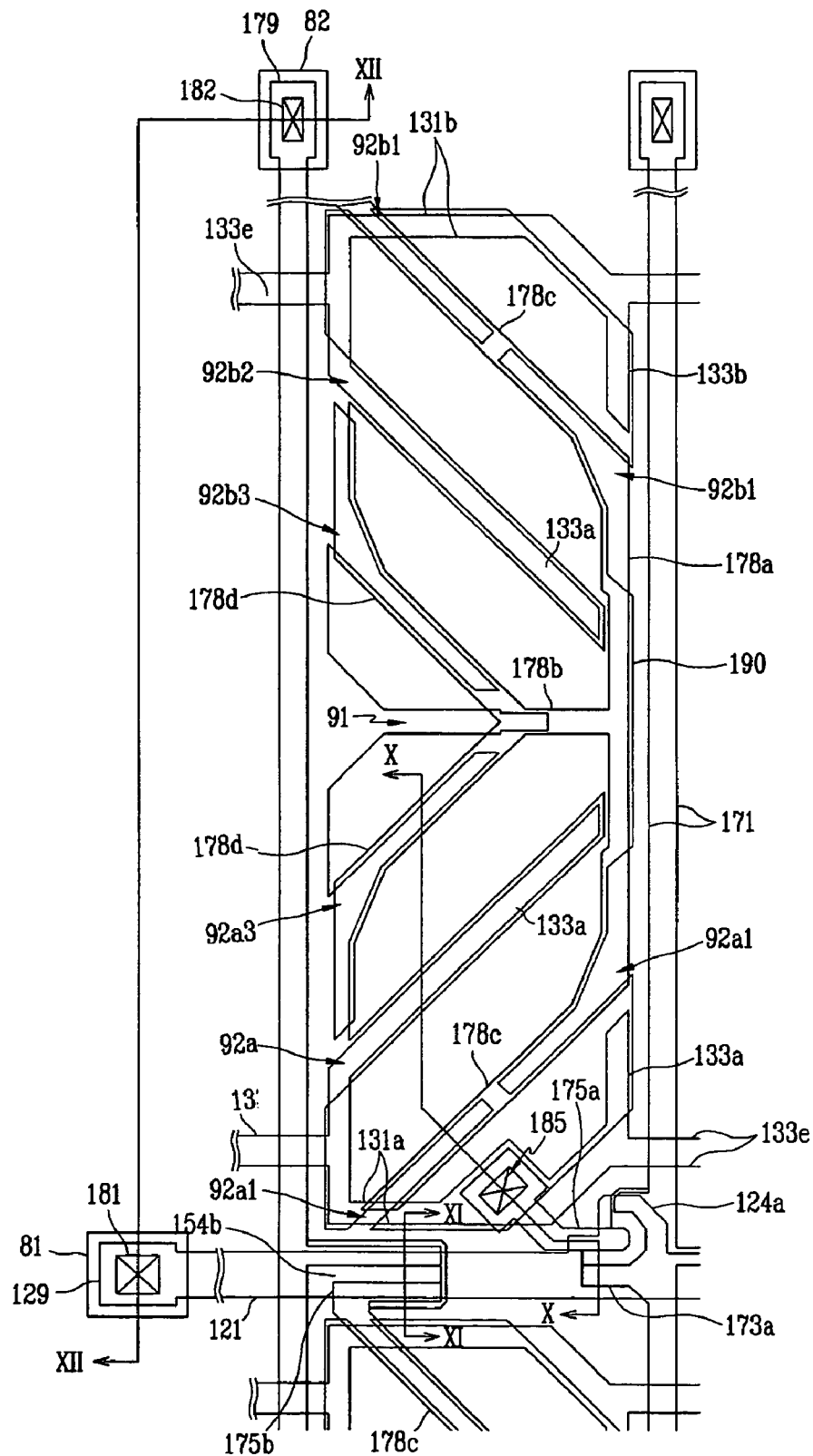
FIG. 9 is a layout diagram illustrating a liquid crystal display according to an exemplary embodiment of the present invention.
Figure 10:
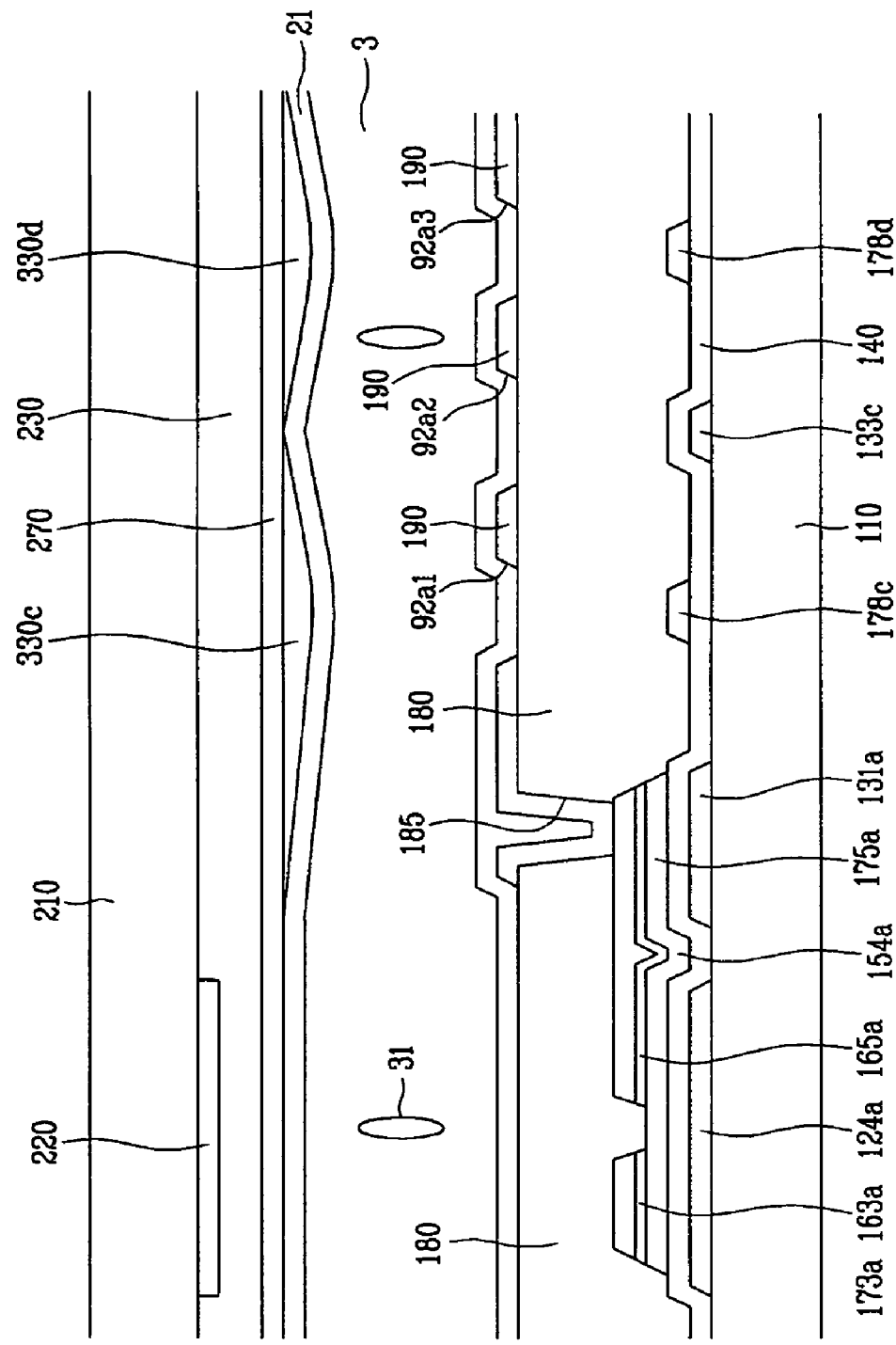
FIG. 10 is a cross-sectional view of the liquid crystal display taken along Line X-X of FIG. 9.
Figure 12:
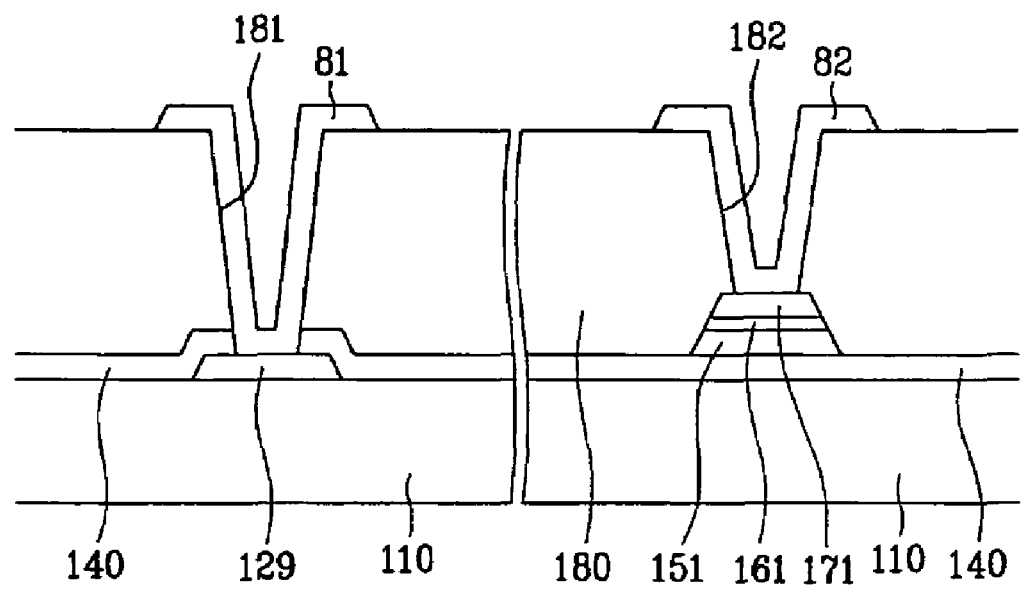
FIG. 12 is a cross-sectional view of the liquid crystal display taken along Line XII-XII of FIG. 9

FIG. 9 is a layout diagram illustrating a liquid crystal display according to another embodiment of the present invention, FIG. 10 is a cross-sectional view of the liquid crystal display taken along Line X-X' of FIG. 9, FIG. 11 is a cross-sectional view of the liquid crystal display taken along Line XI-XI of FIG. 9 and FIG. 12 is a cross-sectional view of the liquid crystal display taken along Line XII-XII of FIG. 9.

As shown in FIGS. 9 to 12, the liquid crystal display according to the present embodiment includes a thin film transistor panel 100 and a common electrode panel 200 located opposite to one another, and a liquid crystal layer 3 interposed therebetween.

The layered structures of the panels 100 and 200 according to the present embodiment are similar to those of the liquid crystal display shown in FIGS. 2 to 6.

The layered structure of the thin film transistor panel 100 is described below. A plurality of gate lines 121 having gate electrodes 124a and 124b and end portions 129 and a plurality of storage electrode lines 131a and 131b having storage electrodes 133a to 133d are formed on a panel 110, and a gate insulating layer 140, a plurality of line-shaped semiconductor patterns 151 including extensions 154a and 154b, a plurality of line-shaped ohmic contact members 161 having extensions 163a and 163b, and a plurality of island-shaped ohmic contact members 165a and 165b are sequentially formed thereon. A plurality of data lines 171 including source electrodes 173a and 173b and end portions 179, a plurality of drain electrodes 175a and 175b, and a plurality of direction control electrodes 178a to 178d are formed on the ohmic contact members 161, 165a and 165b, and then a passivation layer 180 is formed thereon. A plurality of contact holes 181, 182, and 185 are formed in the passivation layer 180 and the gate insulating layer 140, and then a plurality of pixel electrodes 190 having cut portions 91, 92a1 to 92a3, and 92b1 to 92b3 and a plurality of contact assistants 81 and 82 are formed thereon.

The layered structure of the common electrode panel 200 is now described below. A light blocking member 220 having a plurality of openings 225, a plurality of color filters 230, a common electrode 270, and an alignment layer 21 are formed on an insulating panel 210.

Unlike the liquid crystal display shown in FIGS. 2 to 6, in the liquid crystal display according to the present embodiment, the line-shaped semiconductor patterns 151 have substantially the same top shapes as the data lines 171, the drain electrodes 175a and 175b, and the ohmic contact members 161, 165a, and 165b. However, the extensions 154a and 154b of the line-shaped semiconductor patterns 151 have portions not covered with the data lines 171 and the drain electrodes 175a and 175b between the source electrodes 173a and 173b and the drain electrodes 175a and 175b.

In manufacturing the thin film transistors according to an embodiment of the present invention, the data lines 171, the drain electrodes 175a and 175b, the semiconductor patterns 151, and the ohmic contact members 161, 165a, and 165b are formed through the same photolithography process.

A photoresist film used in the photolithography process has different thicknesses by positions, and includes first portions and second portions, in which the first portions have a thickness larger than that of the second portions. The first portions are positioned in a wiring area occupied by the data lines 171, the drain electrodes 175a and 175b, and the direction control electrodes 178a to 178d. The second portions are positioned in channel regions of the thin film transistors.

An example of a method of changing the thickness of the photoresist film can include a method of providing a translucent area in an optical mask in addition to a light transmitting area and a light blocking area. The translucent area is provided with a slit pattern, a lattice pattern, or a thin film having middle transmissivity or middle thickness. When the slit pattern is used, it is preferable that the width of the slits or the gap between the slits is smaller than the resolution of an exposing apparatus used in the photolithography process. As another example, a method employing a photo resist film which can reflow may be used. That is, the photoresist film which can reflow is formed by the use of a general exposure mask having only the light transmitting area and the light blocking area, and the photoresist film is then allowed to reflow into the area where the photoresist film does not remain, thereby forming the thin portions.

In this way, since the photolithography process can be omitted once, the manufacturing method of this exemplary embodiment can be simplified.

Many features of the exemplary embodiments of the liquid crystal display shown in FIGS. 2 to 6 can be applied to the exemplary embodiments of the liquid crystal display shown in FIGS. 9 to 12.

Figure 13:
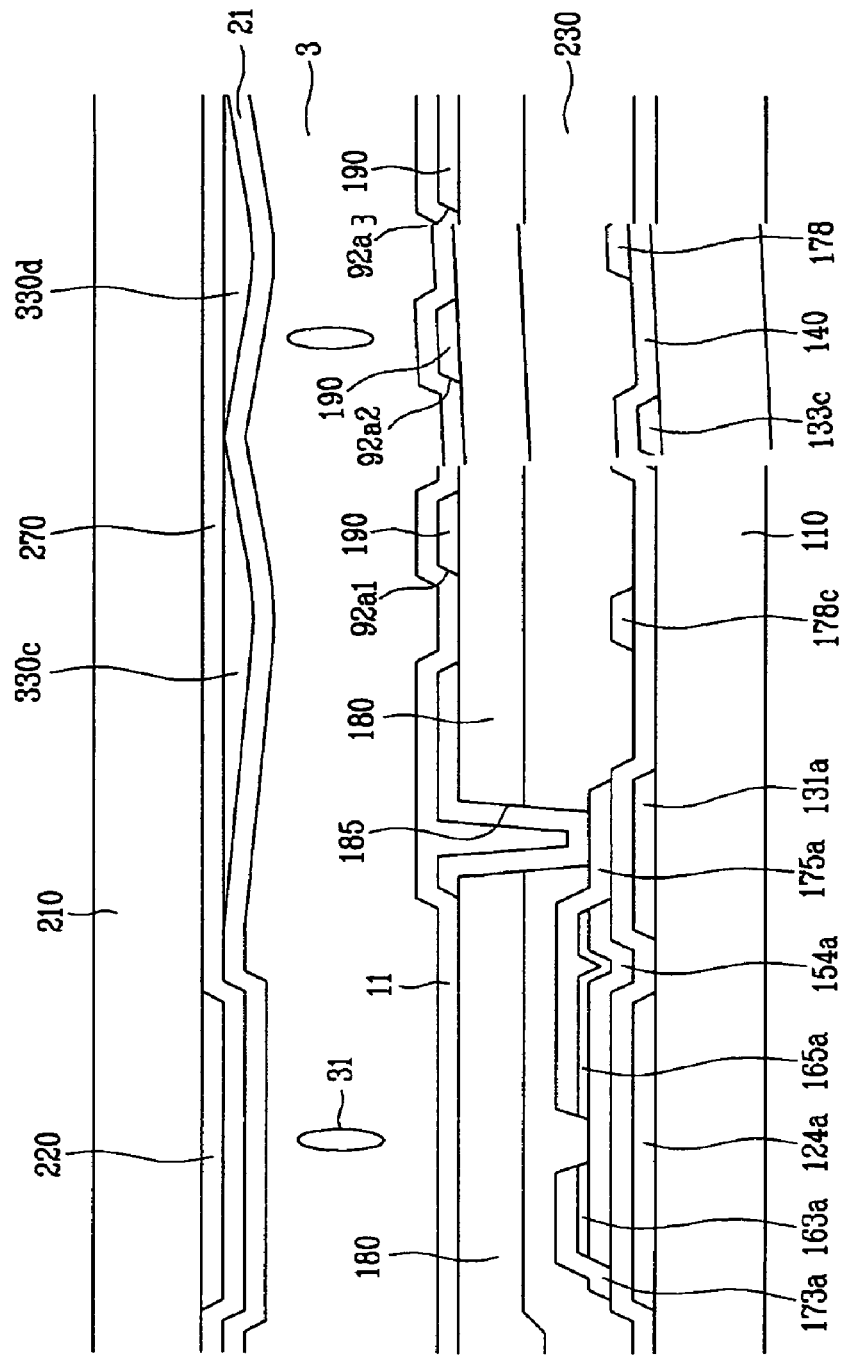
FIGS. 13 and 14 are cross-sectional views of the liquid crystal display taken along Lines V-V and VI-VI of FIG. 2 as other examples of the cross-sectional view of the liquid crystal display shown in FIGS. 2 to 6.
Figure 14:
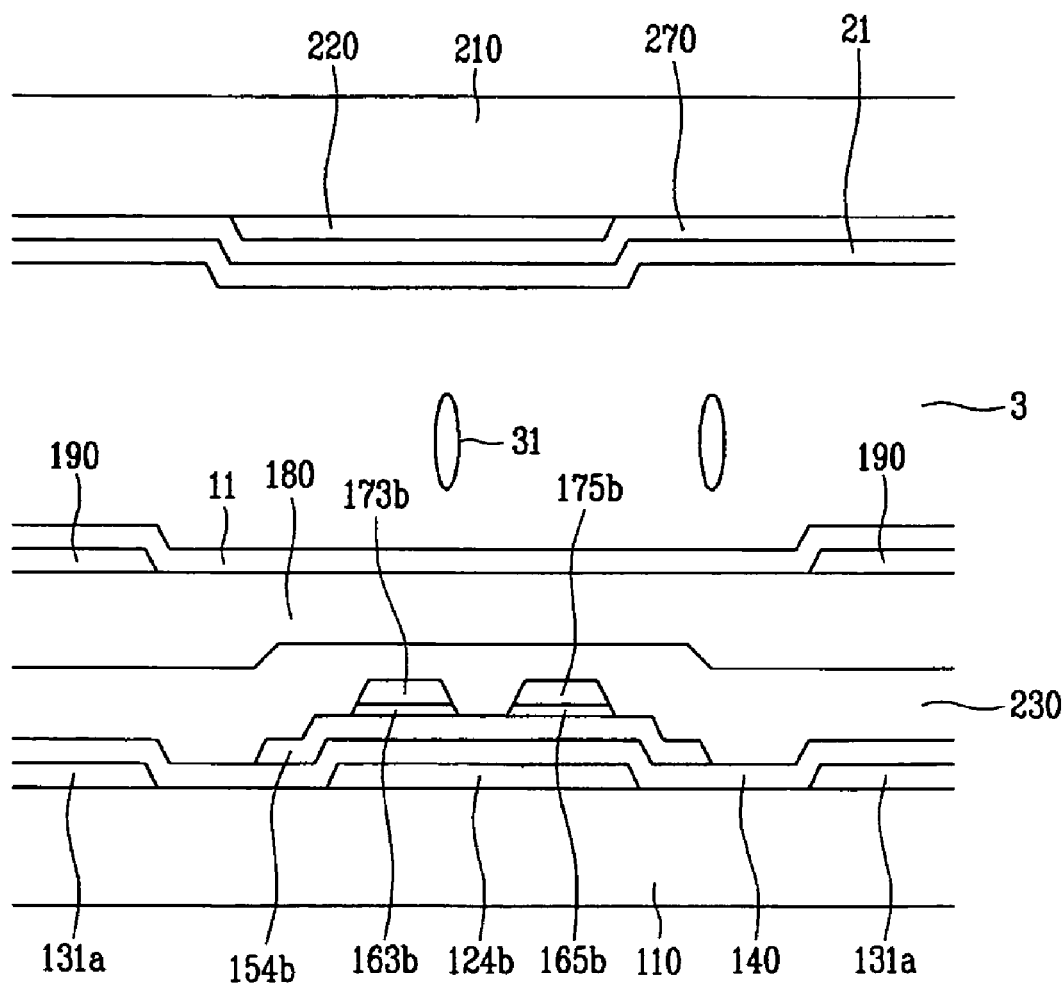

FIGS. 13 and 14 are cross-sectional views of the liquid crystal display taken along Lines V-V and VI-VI of FIG. 2 as other examples of the cross-sectional view of the liquid crystal display shown in FIGS. 2 to 6.

As shown in FIGS. 13 and 14, the liquid crystal display according to this embodiment includes a thin film transistor panel 100 and a common electrode panel 200 located opposite to one another, and a liquid crystal layer 3 interposed therebetween.

The layered structures of the panels 100 and 200 according to the present embodiment are similar to those of the liquid crystal display shown in FIGS. 2 to 6.

The layered structure of the thin film transistor panel 100 is described below. A plurality of gate lines 121 having gate electrodes 124a and 124b and end portions 129, and a plurality of storage electrode lines 131a and 131b having sets of storage branches 133a to 133d are formed on a panel 110, and then a gate insulating layer 140, a plurality of line-shaped semiconductor patterns 151 including extensions 154a and 154b, a plurality of line-shaped ohmic contact members 161 having extensions 163a and 163b, and a plurality of island-shaped ohmic contact members 165a and 165b are sequentially formed thereon.

A plurality of data lines 171 including source electrodes 173a and 173b and end portions 179 and a plurality of drain electrodes 175a and 175b are formed on the ohmic contact members 161, 165a, and 165b, and then a passivation layer 180 is formed thereon. A plurality of contact holes 181, 182, and 185 are formed in the passivation layer 180 and the gate insulating layer 140, and a plurality of pixel electrodes 190 having cut portions 91, 92a1 to 92a3, and 92b1 to 92b3 and a plurality of contact assistants 81 and 82 are then formed thereon.

The layered structure of the common electrode panel 200 is now described below. A light blocking member 220 having a plurality of openings 225, a common electrode 270, a plurality of slope members 330a to 330d, and an alignment layer 21 are formed on an insulating panel 210.

Unlike the liquid crystal display shown in FIGS. 2 to 6, in the liquid crystal display according to the present embodiment, no color filter is formed on the common electrode panel 200, but a plurality of color filters 230 are formed under the passivation layer 180 of the thin film transistor panel 100. The color filters 230 extend vertically along the columns of the pixel electrodes 190, and the neighboring color filters 230 overlap with each other on the data lines 171. Here, the color filters overlapping with each other may function as a light blocking member for blocking light leaking between the neighboring pixel electrodes 190. Accordingly, the light blocking member can be omitted from the common electrode panel 200, thereby simplifying the processes of this exemplary embodiment.

An interlayer insulating layer may be disposed under the color filters 230.

In the liquid crystal display shown in FIGS. 9 to 12, the color filters 230 may be disposed under the passivation layer 180.

Many features of the liquid crystal display shown in FIGS. 2 to 6 can apply to the liquid crystal display shown in FIGS. 13 and 14.

A liquid crystal display according to another embodiment of the present invention will be described in detail with reference to FIGS. 15 and 16.

Figure 15:
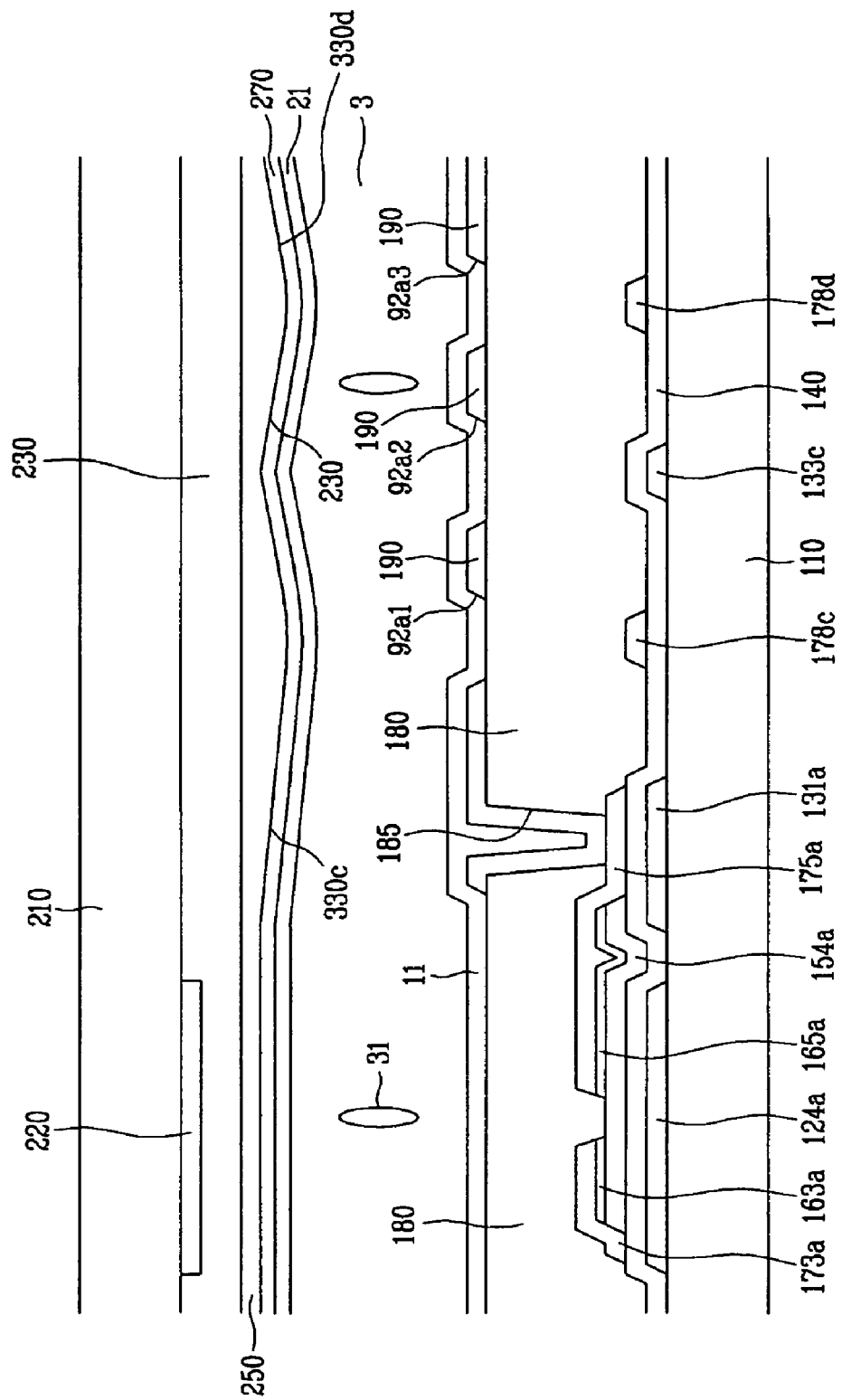
FIGS. 15 and 16 are cross-sectional views of the liquid crystal display taken along Lines V-V and VI-VI of FIG. 2 as other examples of the cross-sectional view of the liquid crystal display shown in FIGS. 2 to 6.
Figure 16:
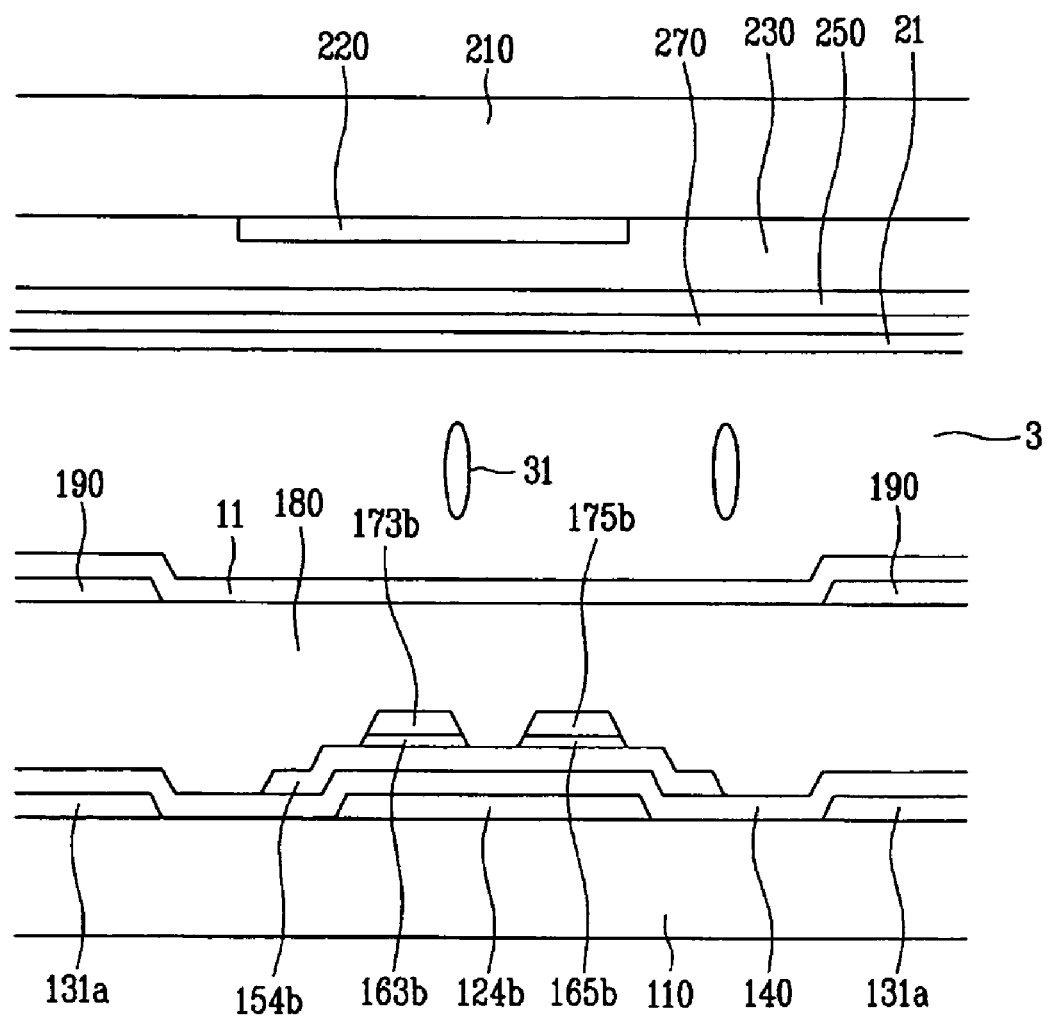

FIGS. 15 and 16 are cross-sectional views of the liquid crystal display taken along Lines V-V and VI-VI of FIG. 2 as other examples of the cross-sectional view of the liquid crystal display shown in FIGS. 2 to 6.

As shown in FIGS. 15 and 16, the liquid crystal display according to the present embodiment includes a thin film transistor panel 100 and a common electrode panel 200 located opposite to one another, and a liquid crystal layer 3 interposed therebetween.

The layered structures of the panels 100 and 200 according to the present embodiment are almost the same as those of the liquid crystal display shown in FIGS. 2 to 6.

The layered structure of the thin film transistor panel 100 is described below. A plurality of gate lines 121 having gate electrodes 124a and 124b and end portions 129 and a plurality of storage electrode lines 131a and 131b having sets of storage branches 133a to 133d are formed on a panel 110, and a gate insulating layer 140, a plurality of line-shaped semiconductor patterns 151 having extensions 154a and 154b, a plurality of line-shaped ohmic contact members 161 having extensions 163a and 163b, and a plurality of island-shaped ohmic contact members 165a and 165b are then sequentially formed thereon. A plurality of data lines 171 having source electrodes 173a and 173b and end portions 179 and a plurality of drain electrodes 175a and 175b are formed on the plurality of ohmic contact members 161, 165a, and 165b, and then a passivation layer 180 is formed thereon. A plurality of contact holes 181, 182, and 185 are formed in the passivation layer 180 and the gate insulating layer 140, and a plurality of pixel electrodes 190 having cut portions 91, 92a1 to 92a3, and 92b1 to 92b3 and a plurality of contact assistants 81 and 82 are then formed thereon.

The layered structure of the common electrode panel 200 is now described below. A light blocking member 220 having a plurality of openings 225, a common electrode 270, a plurality of color filters 230, a plurality of slope members 330a to 330d, and an alignment layer 21 are formed on an insulating panel 210.

In the liquid crystal display shown in FIGS. 13 and 14, unlike the embodiment described with reference to FIGS. 2 to 6, the slope members 330a to 330d are not separately formed on the common electrode 270, but are formed by processing an overcoat layer 250 on the color filters 230 and under the common electrode 270.

The overcoat layer 250 is a layer serving to protect the color filters 230, to prevent the leakage of pigments from the color filters 230, and to provide a flat plane. The overcoat layer 250 is particularly beneficial for example, in the case that cut portions are formed in the common electrode 270 to expose the color filters 230.

Instead of forming the slope members 330a to 330d integrally with the overcoat layer 250, the slope members 330a to 330d may be separately formed on the overcoat layer 250.

Many features of the liquid crystal display shown in FIGS. 2 to 6 can apply to the liquid crystal display shown in FIGS. 15 and 16.

As described above, in the embodiments of the present invention, by adding the slope members to tilt the liquid crystal molecules, it is possible to enhance the response speed of the liquid crystal layer and to thus manufacture a liquid crystal display that can display a motion image.

In addition, since the slope members help the liquid crystal molecules with alignment, it is not necessary to form the cut portions in the common electrode. Accordingly, since a process of patterning the common electrode can be omitted, it is possible to prevent damage due to the introduction of static electricity.

Furthermore, by forming the direction control electrodes to reinforce the electric field by the slope members, the liquid crystal molecules can be rapidly aligned, thereby enhancing the response speed of the liquid crystal layer. Consequently, with the liquid crystal display of the present exemplary embodiments, it is possible to provide a liquid crystal display which can display a motion image.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A liquid crystal display comprising:
a first substrate;
a first electric field generating electrode which is located on the first substrate and which has a plurality of cut portions;
a direction control electrode located on the first substrate and overlapping at least one of the cut portions;
a second substrate facing the first substrate;
a second electric field generating electrode located on the second substrate opposite to the first electric field generating electrode;
a liquid crystal layer interposed between the first electric field generating electrode and the second electric field generating electrode; and
at least one slope member located on the second electric field generating electrode and having a ridge and a slope, wherein the ridge is formed along a direction toward which the direction control electrode extends.

2. The liquid crystal display of claim 1, wherein the second electric field generating electrode has one body covering at least a portion of the second substrate.

3. The liquid crystal display of claim 1, wherein the slope angle of the slope is in the range of about 1° to about 10°.

4. The liquid crystal display of claim 1, wherein the at least one slope member occupies at least half of a total area of the second electric field generating electrode.

5. The liquid crystal display of claim 1, wherein the cut portions include a first cut portion overlapping the direction control electrode and a second cut portion which does not overlap the direction control electrode.

6. The liquid crystal display of claim 5, further comprising a storage electrode located on the first substrate, wherein the storage electrode overlaps with the second cut portion.

7. The liquid crystal display of claim 1, further comprising:
first and second gate lines formed on the first substrate;
first and second data lines intersecting the first and second gate lines;
a first thin film transistor connected to the first gate line, the first data line, and the direction control electrode; and
a second thin film transistor connected to the second gate line, the second data line, and the first electric field generating electrode.

8. The liquid crystal display of claim 7, wherein the second thin film transistor is turned on immediately after the first thin film transistor is turned off.

9. The liquid crystal display of claim 7, wherein the at least one slope member and the cut portions form an angle of about 45° about the gate lines.

10. The liquid crystal display of claim 1, further comprising a plurality of color filters formed under one of the first electric field generating electrode and the second electric field generating electrode.

11. The liquid crystal display of claim 10, further comprising an overcoat layer formed between the second electric field generating electrode and the color filters.

12. The liquid crystal display of claim 1, wherein the slope member has double slope angles.

13. The liquid crystal display of claim 1, wherein the at least one slope member comprises a plurality of slope members located on the second electric field generating electrode.

14. A liquid crystal display device comprising:
a thin film transistor panel;
a first electric field generating electrode which is located on the thin film transistor panel and which has a plurality of cut portions;
a direction control electrode located on the thin film transistor panel and overlapping at least one of the cut portions;
a common electrode panel facing the thin film transistor panel;
a second electric field generating electrode located on the common electrode panel opposite to the first electric field generating electrode;
a liquid crystal layer interposed between the first electric field generating electrode and the second electric field generating electrode;
at least one slope member located on the second electric field generating electrode and having a ridge and a slope, wherein the ridge is formed along a direction toward which the direction control electrode extends; and
a backlight unit for supplying light to the liquid crystal layer.

* * * * *